(12) United States Patent
Zhang et al.

(10) Patent No.: US 12,160,166 B2
(45) Date of Patent: Dec. 3, 2024

(54) DRIVER CIRCUITRY AND OPERATION

(71) Applicant: Cirrus Logic International Semiconductor Ltd., Edinburgh (GB)

(72) Inventors: Lingli Zhang, Austin, TX (US); Yongjie Cheng, Austin, TX (US); John L. Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 149 days.

(21) Appl. No.: 17/971,039

(22) Filed: Oct. 21, 2022

(65) Prior Publication Data

US 2023/0344331 A1     Oct. 26, 2023

Related U.S. Application Data

(60) Provisional application No. 63/333,417, filed on Apr. 21, 2022.

(51) Int. Cl.
*H02M 1/00* (2007.01)
*H02M 1/08* (2006.01)
(Continued)

(52) U.S. Cl.
CPC ........... *H02M 1/0095* (2021.05); *H02M 1/08* (2013.01); *H02M 3/07* (2013.01); *H04R 3/00* (2013.01)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103;
(Continued)

(56) References Cited

U.S. PATENT DOCUMENTS 11,349,441 B2 *  5/2022  Holzmann ............ H03F 3/2171
2012/0140958 A1   6/2012  Lin et al.
(Continued)

FOREIGN PATENT DOCUMENTS

WO      2022243674 A1   11/2022
WO      2023002158 A1    1/2023

OTHER PUBLICATIONS

Combined Search and Examination Report under Sections 17 and 18(3), UKIPO, Application No. GB2305055.2, mailed Oct. 6, 2023.

*Primary Examiner* — Jeffrey A Gblende
(74) *Attorney, Agent, or Firm* — Jackson Walker L.L.P.

(57) ABSTRACT

A driver apparatus for driving a load with a differential drive signal is described. For a level of input signal within a first range, a first switching driver modulates the voltage at a first output node with a first modulation index by switchably connecting at least one flying capacitor to the first output node, whilst a second switching driver modulates the voltage at a second output node with a second modulation index by controlling switching between DC voltages that are maintained throughout a switching cycle of the driver apparatus. The first and second switching drivers are controlled so, for at least a first part of the first input range, a change in input signal level results in a change of the first controlled modulation index that has a different magnitude to any change in the second controlled modulation index, a constant modulation frequency of the differential drive signal is maintained.

18 Claims, 9 Drawing Sheets

(51) Int. Cl.
*H02M 3/07* (2006.01)
*H04R 3/00* (2006.01)

(58) Field of Classification Search
CPC .......... H02M 7/106; H02M 7/19; H02M 7/08;
H02M 7/17; H02M 2001/007; H02M
7/493; H02M 7/53806; H02M 7/5381;
H02M 7/483; H02M 7/217; H02M
7/538466; H02M 7/5387; H02M 7/53871;
H02M 7/53873; H02M 7/53875; H02M
1/084; H02M 1/0845; H02M 1/007;
H02M 1/0009; H02M 1/08; H02M
3/1588; H02M 7/5395; H02M 1/14;
H02M 1/0043; H02M 1/0074; H02M
1/0077; H02M 1/0095; H02M 3/07; H02J
3/46; H02J 3/38
See application file for complete search history.

(56) References Cited

U.S. PATENT DOCUMENTS

| | | | |
|---|---|---|---|
| 2023/0067217 A1* | 3/2023 | Terwal | H03F 3/185 |
| 2023/0268830 A1* | 8/2023 | Botti | H03F 3/2173 |
| | | | 323/222 |

\* cited by examiner

DRIVER CIRCUITRY AND OPERATION

FIELD OF DISCLOSURE

The field of representative embodiments of this disclosure relates to methods, apparatus and/or implementations concerning or relating to driver circuits, and in particular to switching driver circuits as may be used to drive a transducer.

BACKGROUND

Many electronic devices include transducer driver circuitry for driving a transducer with a suitable driving signal, for instance for driving an audio output transducer of the host device or a connected accessory, with an audio driving signal.

In some applications the driver circuitry may include a switching amplifier stage, e.g. a class-D amplifier output stage or the like, for generating the drive signal. Switching amplifier stages can be relatively power efficient and thus can be advantageously used in some applications. A switching amplifier stage generally operates to switch an output node between different switching voltages, with a duty cycle that provides a desired average output voltage over the course of the duty cycle for the drive signal.

In some cases, the switching amplifier stage may comprise a multi-level converter that is operable to selectively switch the output node between switching voltages selected from a set of more than two different switching voltages. The switching voltages used at any time may be selectively varied to provide different output ranges according to the level of the input signal. For example, the switching amplifier may switch between switching voltages V1 and V2 or between switching voltages V2 and V3, where V1<V2<V3, depending on the signal level.

At least one of the switching voltages may be a system voltage, i.e. a defined DC voltage generated or maintained by some other components and available to the switching amplifier stage, such as a supply voltage VDD or ground, or may be a voltage generated from a system voltage by a DC-DC converter associated with the switching amplifier stage, e.g. by a charge pump or inductive converter or the like. Such voltages are maintained in a substantially continuous manner, that is, the relevant voltage is maintained at a substantially constant level and does not substantially vary over the course of a full switching cycle of the switching amplifier (although voltages generated by a DC-DC converter may exhibit some voltage ripple due to operation of the DC-DC converter).

In some implementations, the switching amplifier stage may thus selectively switch the output node between selected ones of a set of continuous DC voltages.

However, it can be advantageous in terms of power efficiency and/or circuit area for one or more of the switching voltages to be generated in a discontinuous manner, such that the switching voltage is generated only for the part of the switching cycle for which it is required. For example, a flying capacitor which is charged to a certain voltage may be selectively switched into a signal path to the output node to provide selective voltage boosting, so as to modulate the voltage at the output node between two switching voltages with a controlled duty-cycle. One of the switching voltages is, at least partly, provided by the voltage of the flying capacitor and is generated only for the part of the switching cycle in which the flying capacitor is connected into the relevant signal path. This operation can offer advantages in terms of power efficiency and/or circuit area but modulating the voltages at the output node in this way means that the output resistance is duty-cycle dependent. The flying capacitor is effectively connected into the signal path to provide voltage boosting for part of the switching cycle and then is recharged during the rest of the rest of the switching cycle. The amount of time available for recharging the capacitor depends on the duty-cycle which results in a duty-cycle dependent output impedance. Duty-cycles in which the flying capacitor is only recharged for a small proportion of the switching cycle can be disadvantageous.

SUMMARY

Embodiments of the present disclosure relate to improved switching driver circuits and to methods of operation.

According to an aspect of the disclosure there is provided a driver apparatus configured to output first and second drive signals at respective first and second output nodes for driving a load connected between the first and second output nodes with a differential drive signal based on an input signal. The driver apparatus comprises a first switching driver configured to modulate a voltage at the first output node with a first controlled modulation index to generate the first drive signal and a second switching driver configured to modulate a voltage at the second output node with a second controlled modulation index to generate second drive signal. For a level of the input signal within a first input range, the first switching driver is configured to modulate the voltage at the first output node by switchably connecting at least one flying capacitor into a signal path to the first output node and the second switching driver is configured to modulate the voltage at the second output node by controlling switching of the second output node between first and second DC voltages, wherein each of first and second voltages DC are maintained at a defined nominal voltage level throughout a switching cycle of the driver apparatus. A controller is provided for controlling the first and second switching drivers such that, if the input signal varies within said first input range, a constant modulation frequency of the differential drive signal is maintained and, for at least a first part of the first input range, a change in input signal level results in a change of the first controlled modulation index that has a different magnitude to any change in the second controlled modulation index.

The controller may be configured such that, for the first part of the first input range, a change in input signal level results in an increase of the first controlled modulation index and a decrease in the second controlled modulation or vice versa, and the magnitude of change of the first controlled modulation index is lower than the magnitude of change of the second controlled modulation index. The first part of the first input range may, in some examples, comprise the whole of the first input range.

In some examples, the controller may be configured such that, for said first part of the first input range, the second switching driver maintains the second output node connected to one of first and second DC voltages throughout the switching cycle and a change in input signal level results in a change of the first controlled modulation index only. The controller may be configured such that, for a second part of the first input range, different to the first part, the second switching driver switches the second output node between the first and second DC voltages during the switching cycle and a change in input signal level results in an increase of the first controlled modulation index and a decrease in the second controlled modulation or vice versa. The controller may be configured such that, for an input signal in the first part of the first input range, the first switching driver operates to modulate the voltage at the first output node with a modulation frequency which is twice that for signals in the second part of the first input signal range. The first part of the input signal range may correspond to input signal levels of greater magnitude than the second part of the input signal range. The controller may be configured such that, for a change in signal level in the second part of the first input range, the magnitude of change of the first controlled modulation index is the same as the magnitude of change of the second controlled modulation index. Alternatively the controller may be configured such that, for a change in signal level in the second part of the first input range, the magnitude of change of the first controlled modulation index is lower than the magnitude of change of the second controlled modulation index.

The controller may be configured such that the first controlled modulation index is not increased above a predetermined maximum value which is less than 1.

In some examples, for an input signal level in the first range, the first switching driver may be configured to modulate the voltage at the first output node between one of the first and second DC voltages and a boosted voltage which is different to the first and second DC voltages.

In some examples, for a level of the input signal within a second input range, different to the first input range, each of the first and second switching drivers may be configured to modulate the voltage at the respective first and second output node by controlling switching of the respective first and second output node between the first and second DC voltages. The controller may be configured such that, if the input signal varies within the second input range, a change in input signal level results in a change of the first controlled modulation index that has a different magnitude to any change in the second controlled modulation index.

The driver apparatus may be implemented as an integrated circuit. Aspects also relate to an electronic device comprising the driver apparatus of any of the embodiments discussed herein.

In another aspect, there is provided a driver apparatus with first and second output nodes for driving a load with a differential drive signal based on an input signal, the driver apparatus comprising a first switching driver configured to modulate a voltage at the first output node with a first controlled modulation index and a second switching driver configured to modulate a voltage at the second output node with a second controlled modulation index. The driver apparatus is operable in a first mode in which the first switching driver operates with an output impedance that varies with the first controlled modulation index and the second switching driver operates with an output impedance that does not vary with the second controlled modulation index. A controller is configured to control the first and second switching drivers in the first mode for a level of input signal within a first input range, such that, if the input signal varies within the first input range, a constant modulation frequency of the differential drive signal is maintained and, for at least a first part of the first input range, a change in input signal level results in a change of the first controlled modulation index that has a different magnitude to any change in the second controlled modulation index.

In another aspect, there is provided a driver apparatus configured to output first and second drive signals at respective first and second output nodes for driving a load connected between the first and second output nodes with a differential drive signal based on an input signal. The driver apparatus comprises a first switching driver configured to generate the first drive signal, the first switching driver being operable in a flying capacitor mode to generate the first drive signal by switchably connecting at least one flying capacitor into a signal path to the first output node to modulate the voltage at the first output node with a first controlled modulation index, and a second switching driver configured to generate the second drive signal, the second switching driver being operable in a switching DC mode to generate the first drive signal by switching the second output node between first and second DC voltages at a second controlled modulation index, wherein each of first and second voltages DC are maintained at a defined nominal voltage level throughout a switching cycle of the driver apparatus. A controller is configured to control the first and second switching drivers, wherein the controller is configured such that for a level of the input signal in a first range, the driver apparatus is operated in a first apparatus mode in which first switching driver is operated in the flying capacitor mode and the second switching driver is operated in a switching DC mode, and for a level of the input signal in a second, different, range the driver apparatus is operated in a second apparatus mode, in which first switching driver is operated in the flying capacitor mode and the second switching driver is operated to maintain the voltage at the second output node at a constant one of the first and second DC voltages. The modulation frequency of the differential drive signal is the same in the first and second apparatus modes.

In a further aspect there is a driver apparatus configured to output first and second drive signals at respective first and second output nodes for driving a load connected between the first and second output nodes with a differential drive signal based on an input signal. The driver apparatus comprises a first switching driver configured to modulate a voltage at the first output node with a first controlled modulation index to generate the first drive signal and a second switching driver configured to modulate a voltage at the second output node with a second controlled modulation index to generate second drive signal. For a level of the input signal within a first input range, the first switching driver is configured to modulate the voltage at the first output node by switchably connecting at least one flying capacitor into a signal path to the first output node and the second switching driver is configured to modulate the voltage at the second output node by controlling switching of the second output node between first and second DC voltages, wherein each of first and second voltages DC are maintained throughout a switching cycle of the driver apparatus. A controller controls the first and second switching drivers such that a change in input signal level within the first input range results in an increase of the first controlled modulation index and a decrease in the second controlled modulation or vice versa, wherein the magnitude of change of the first controlled modulation index is lower than the magnitude of change of the second controlled modulation index.

It should be noted that, unless expressly indicated to the contrary herein or otherwise clearly incompatible, then any feature described herein may be implemented in combination with any one or more other described features.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the disclosure relate to methods and apparatus for driving a transducer in a bridge-tied-load configuration, i.e. where the load is connected between first and second output nodes, and respective driving signals are applied to the first and second output nodes to provide a desired differential drive signal across the load based on an input signal. Embodiments relate, in particular, to driver apparatus having first and second switching drivers for respectively modulating voltages at the first and second output nodes, which is operable, for a level of the input signal within a first input range, such that the first switching driver modulates the voltage at the first output node by switchably connecting at least one flying capacitor into a signal path to the first output node and the second switching driver modulates the voltage at the second output node by controlling switching of the second output node between first and second DC voltages, wherein each of first and second voltages DC are maintained throughout a switching cycle of the driver apparatus. During such operation, the output impedance of the first switching driver, which selectively connects the at least one flying capacitor to the output path, depends on the modulation index, i.e. duty-cycle of the first switching driver, whereas the output impedance of the second switching driver, which switches between continuous DC voltages, is independent of the modulation index. In embodiments of the present disclosure a controller controls the modulation indexes of the first and second switching drivers to provide the differential drive signal in a way that prioritises whichever driver has the lowest output impedance for a particular signal level. The controller may, in particular, be configured such that, for at least a first part of the first input range, a change in input signal level results in a change of the modulation index for the first switching driver that has a different magnitude to any change in the modulation index of the second switching driver.

Figure 1:
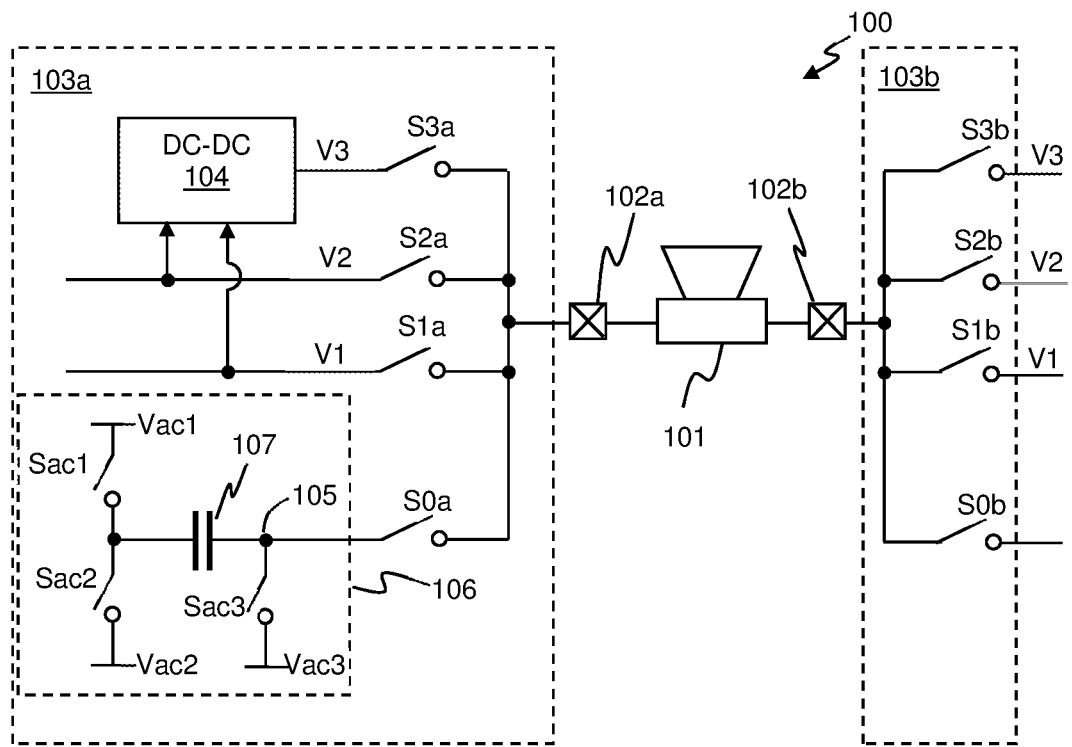
FIG. 1 illustrates one example of a multi-level converter circuit for driving a load.

FIG. 1 illustrates the principles of a driver apparatus 100 for driving a load 101 according to an embodiment. FIG. 1 illustrates that driver apparatus has first and second output nodes 102*a* and 102*b* for outputting respective driving signals for driving the load 101 in a bridge-tied-load (BTL) arrangement. A first switching driver 103*a* is operable to modulate the voltage at the first output node 102*a* and a second switching driver 103*b* is operable to modulate the voltage at the second output node 102*b*.

The first switching driver 103*a* is configured such that the first output node 102*a* can be selectively connected, via switching paths S1*a*, S2*a* and S3*a*, to any of three supply voltages V1, V2 or V3, at respective switching voltage nodes.

FIG. 1 illustrates that the voltages V1 and V2 may be system voltages, which, as used herein, shall refer to any generally continuous voltage maintained or generated by other components, and which is received by/available to the driver apparatus. For example V1 and V2 could be ground and a received input supply voltage +VDD (or −VDD). The input supply voltage V2 may be derived from a system battery voltage, possibly with some voltage regulation and/or boosting applied by some other upstream circuitry and/or the input supply voltage could be provided from a system power supply, such as a switched mode-power supply. Switching path S1*a* selectively connects the output node 102*a* to the received voltage V1 and switching path S2*a* selectively connects the output node 102*a* to the received voltage V2.

In the example of FIG. 1, a third, different, supply voltage V3 is generated by a DC-DC converter 104, which may comprise a charge pump or an inductive converter or the like. In this example, the DC-DC converter may generate the voltage V3 using the received system voltages V1 and V2. The output node 102*a* can be selectively connected to the supply voltage V3 output by the charge pump by switching path S3*a*.

Each of the voltages V1, V2 and V3 is, in use, maintained in a substantially continuous manner, that is, the relevant voltage is maintained at a substantially constant level and the voltage at the relevant switching node thus does not substantially vary over the course of a full switching cycle of the first switching driver 103*a*. Where the DC-DC converter 104 is a switched mode converter, such as a charge pump, the DC-DC converter is operable to maintain the supply voltage throughout a full switching cycle of the DC-DC converter. The voltages at the relevant switching node is thus substantially independent of the input signal for the driver apparatus 100. It will, of course, be understood that the output voltage of a DC-DC converter, such as a charge pump or inductive boost converter or the like, may exhibit some voltage ripple due to the operation of the DC-DC converter, but the extent of such ripple is relative small and a DC-DC converter such as a charge pump generally comprises an energy storage element such as a reservoir capacitor to maintain the output voltage throughout the whole of switching cycle of the DC-DC converter.

It should also be noted that the voltage V3, generated by the DC-DC converter 104 is generated in a substantially continuous manner when the DC-DC converter is active. This does not, however, mean that the DC-DC converter need be continuously active. If, for instance, the supply voltage generated by the DC-DC converter is only used for relatively high magnitude output signals of the driver apparatus 100, in some cases the DC-DC converter 104 may be controlled to be inactive if the input signal magnitude is relatively low. However, when active, the DC-DC converter operates to maintain its output supply voltage V3 in a continuous manner.

The voltages V1, V2 and V3 provide a first set of switching voltages and, in use, the first switching driver 103a may switch the first output node 102a between a selected pair of these switching voltages with a controlled modulation index or duty cycle, so as to provide the desired output signal. The first output node 102a is switched between these voltages by controlling the relevant switching paths S1a, S2a and S3a to connect the output node to the relevant supply voltages with a controlled modulation index. Such operation can be seen as direct-coupled switching, or a direct charge transfer mode of operation, as the first output node 102a is switched to be directly coupled to the relevant DC voltage supplies. As noted above, the DC supply voltages may, for example, be derived from a battery, an inductive switched mode power supply, or a switched capacitor power supply and maintain the voltage in substantially continuous fashion, i.e. are generally able to supply current for an extended period of time, for example greater than the period of the output drive signal at the lowest needed frequency. The terms "direct-coupled" and "DC-coupled" shall be used herein to refer to such switching of the output node between such supply voltages.

In addition, the first switching driver 103a is operable so that the first output node 102a may be selectively coupled, via switching path 50a, to an output voltage node 105 of a flying capacitor driver 106. The output voltage node 105 is coupled to a first terminal of a capacitor 107. The second terminal of capacitor 107 is configured to be selectively switched between two different voltages Vac1 and Vac2 by switches Sac1 and Sac2. The first terminal of the capacitor 107 may also be selectively connected to a voltage Vac3, by switch Sac3. In use, the capacitor 107 may be cyclically charged in a charge phase and then connected to provide voltage boosting (positive or negative) of one of the voltages Vac1 and Vac2 in a transfer phase, to generate a boosted voltage at the switching voltage node. The capacitor 107 is thus used as a flying capacitor for generating a boosted voltage. The voltages Vac1, Vac2 and Vac3 may be selected such that the boosted voltage generated at the output voltage node 105 is different to any of the voltages V1, V2 and V3. The voltage Vac1 is different to the voltage Vac2 and, if the switches Sac1 and Sac3 are operated in phase with one another, then Vac1 and Vac3 are also different from one another so that the capacitor 107 is charged by the voltage difference between Vac1 and Vac3 when both these switches are closed. Vac2 and Vac3 may be the same as one another or different. It will be understood that Vac1 may be more or less positive than Vac2 and/or Vac3. Conveniently at least one, and possibly all, of the voltages Vac1, Vac2 and Vac3 is provided by the supply voltage V1, V2 and V3, but any other system voltage could be used to provide one or more of these voltages.

For example, consider that the supply voltage V2 is used for Vac1 and that the supply voltage V1 is used for both Vac2 and Vac3, with the supply voltage V2 being more positive than V1. In use, in the charge phase, switches Sac1 and Sac3 are closed to connect the second terminal of the capacitor 107 to Vac1=V2 and the first terminal of the capacitor 107 to Vac3=V1, so that the capacitor is charged to a voltage +(V2−V1) with the positive plate at the second terminal. In this charge phase, the output voltage node 105 is at the voltage Vac3=V1. In the transfer phase, switch Sac2 is closed instead to connect the second terminal of the capacitor 107 to Vac2=V1 with the first terminal of the capacitor 107 disconnected from Vac3. In this transfer phase, the capacitor 107 provides negative boosting of the supply voltage Vac2, which thus generates a negatively boosted voltage V0 at the output voltage node, where V0=−(V2 −V1). In this example, the output voltage node 105 can thus be switched between the voltages V1 and V0, with the duty cycle being controlled by the switching of switches Sac1, Sac2 and Sac3. The capacitor 107, together with the switches Sac1, Sac2 and Sac3 can thus be seen as a flying capacitor based auxiliary driver or charge pump 106 for driving the output node.

It will be understood that the flying capacitor driver 106 could, instead, be used to provide positive boosting. For instance, if Vac1 was equal to V2 and Vac2 and Vac3 equal to V3, with V3 more positive than V2, then the capacitor 107 could be charged to +V3−V2 with the positive plate at the first terminal by closing switches Sac1 and Sac3 in a charging phase, and then used to provide a positive boosted voltage V0=V3+(V3−V2) with switch Sac2 closed in a transfer phase.

The capacitor 107 can thus be selectively switched to provide selective boosting to provide a voltage V0, which may be different to the voltages V1, V2 and V3. Such operation can be seen as an indirect-coupled switching, or an indirect charge transfer mode of operation, as, in operation when the voltage V0 is generated, the output node is indirectly coupled to the supply Vac2 via the capacitor. The voltage V0 is not maintained continuously throughout the whole switching cycle of the driver apparatus. As used herein, the terms "indirect-coupled" or "indirect switching" will be used to refer to such operation and the term "AC-coupled" will also be used to such operation.

The first switching driver 103a is thus operable in a direct-coupled mode of operation, in which the first output node 102a is switched between selected ones of the supply voltages V1, V2, V3, and is also operable in an indirect-coupled mode of operation, to generate at least one additional voltage V0. The first switching driver 103a is thus a mixed direct-coupled and indirect-coupled switching driver. Energy can be transferred to the load 101 via a mix of "DC-coupled" and "AC-coupled" paths according to the required output signal.

The second switching driver 103b is operable in a similar manner as the first switching driver 102a, and, as illustrated, has switching paths S1b, S2b and S3b for selectively connecting the second output node 102b to any of the continuous voltages V1, V2 or V3. The voltage V3 may be supplied from the DC-DC converter 104 and thus the DC converter 104 may effectively be shared between the first and second switching drivers 103a and 103b. The second switching driver 103b may also be operable in an indirect-coupled mode to provide AC-coupled switching. Switching path S0b may selectively couple the second output node to a flying capacitor driver. In this example the flying capacitor driver 106 may effectively be shared between the first and second switching drivers 103a and 103b and thus switching path S0b may connect the second output node 102b to the voltage output node 105 of the flying capacitor driver 106.

Each of the first and second switching drivers 103a and 103b is thus selectively operable in a direct-coupled mode of operation to switch the respective output node 102a or 102b between the continuous voltages V1, V2 or V3, or operable in an indirect-coupled mode of operation to use the flying capacitor driver 106 to modulate the voltage at the relevant output node 102a or 102b in an AC-coupled manner.

When one of the switching drivers 103a or 103b operates in the direct-coupled mode of operation, and switches the relevant output node between continuous voltages, the output impedance of the switching driver is substantially constant. However, when the switching driver operates in the indirect-coupled mode, using flying capacitor driver 106 to modulate the voltage at the relevant output node, the output impedance has a dependency on the modulation index, or duty-cycle, of the flying capacitor driver 106. As discussed above, the capacitor 107 may be charged in a charge phase and may transfer charge with the load in a transfer phase. The time available to recharge the capacitor 107 during the charge phase depends on the modulation index or duty cycle of the flying capacitor driver.

Figure 2:
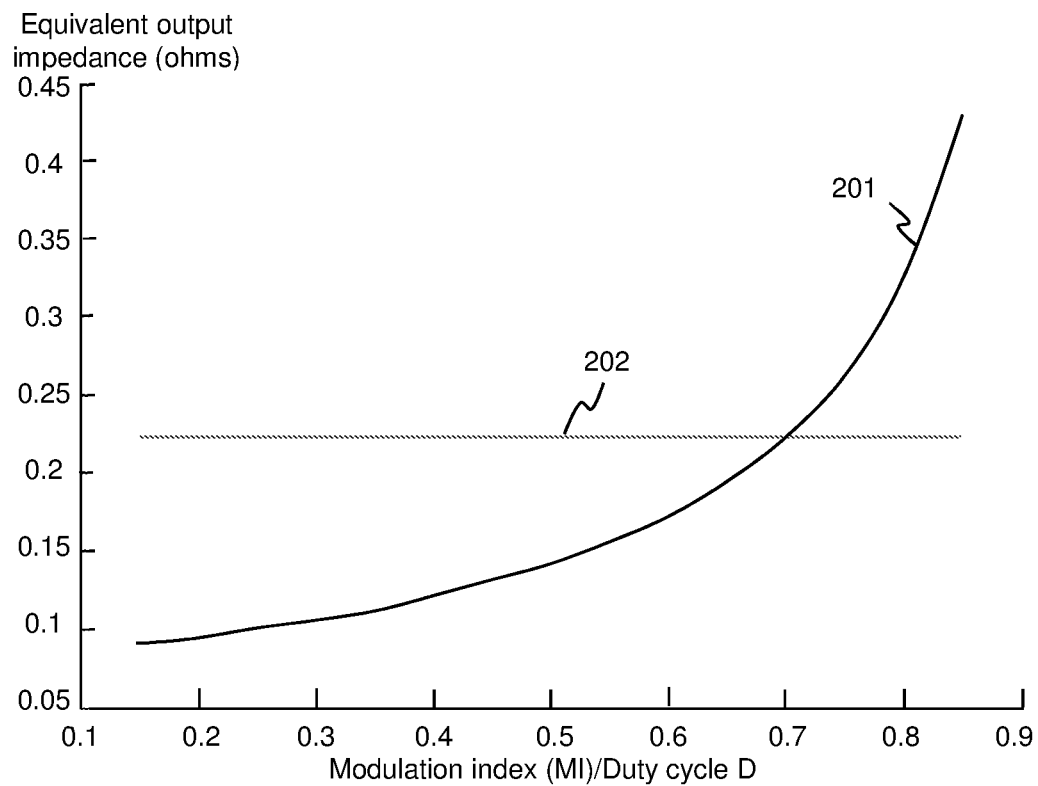
FIG. 2 illustrates how equivalent output impedance can vary with duty-cycle for AC-coupled switching.

FIG. 2 illustrates the equivalent output impedance 201 of a typical AC-coupled energy transfer system where the equivalent output impedance is duty-cycle dependent and also the equivalent output impedance 202 of a typical DC-coupled energy transfer system where the equivalent output impedance is duty-cycle independent. The plot 201 for the AC-coupled system thus represents the equivalent output impedance of the first switching driver 103a (or second switching driver 103b) when operating in the indirect-coupled mode, and how it varies with duty cycle D. Note that the duty-cycle D in this case is the proportion of time of the switching cycle spent in the transfer phase (as opposed to the charge phase). The plot 202 for the DC-coupled system thus represents the equivalent output impedance of the first switching driver 103a (or second switching driver 103b) when operating in the direct-coupled mode and illustrates that this equivalent output impedance does not substantially vary with duty cycle. It can be seen that the equivalent output impedance 201 when operating in the indirect-coupled mode may be relatively low at low duty cycles and may be lower than the equivalent output impedance 202 when operating in the direct-coupled mode. However, for higher values of duty cycle, the equivalent output impedance 201 when operating in the indirect-coupled mode may be greater than the equivalent output impedance 202 when operating in the direct-coupled mode and may give rise to a high-value, which can be undesirable. In such a mixed "DC-coupled" and "AC-coupled" energy transfer system, due to the different output impedance sensitivity to duty cycle, when the input signal level results in a lower duty cycle, the AC-coupled switching may seem more efficient, but for signal levels requiring a higher duty-cycle, the DC-coupled switching may be more efficient.

In the example of FIG. 1, one of the first and second switching drivers 103a and 103b may be operated in the indirect-mode of operation whilst the other one of the first and second switching drivers is operated in the direct-mode of operation. In this case, one of the switching drivers will exhibit an equivalent output impedance which has a duty-cycle dependence whilst the other switching drivers will have an equivalent output impedance which is duty-cycle independent. Embodiments of the present disclosure are configured such that, during such operation, the first and second switching drivers are controlled so that the weighting for the contribution from each switching driver may be different to one another so as to limit the increase of duty-cycle of the switching driver operating in the indirect mode.

To explain this principle, consider a driver apparatus 100 such as described with reference to FIG. 1, which receives system voltages of a positive supply voltage VP and ground, i.e. V2=+VP and V1=0V. In this example, any voltage from the DC-DC converter 104, i.e. V3, will be ignored for ease of explanation. In this example, the flying capacitor driver 106 is operable with Vac1 equal to ground, and Vac2 and Vac3 both equal to +VP, so that in a charge phase, switches Sac1 and Sac3 are closed (with Sac2 open) to charge the capacitor 107 to the voltage +VP, with the output voltage node 105 being at +VP, and in the transfer phase, switch Sac2 is closed (with Sac1 and Sac3 open) so that the voltage at the output node 105 is positively boosted to +2VP.

In this example, each of the first and second switching drivers 103a and 103b is thus operable in a DC-coupled switching mode, to switch the relevant output node between the system voltages +VP and 0V, or in an AC-coupled switching mode using the flying capacitor driver 106, to switch the voltage at the relevant output node between voltage +2VP (in the transfer phase) and +VP (in the charge phase).

The first and second switching drivers 103a and 103b may be controlled in a relevant mode based on the level of the input signal. For instance, for an input signal in a first range, both of the first and second switching drivers 103a and 103b may be operated in the DC-coupled switching mode and switched between the voltage +VP and 0V with first and second controlled duty cycles. The first and second duty-cycles of first and second switching drivers 103a and 103b are controlled so that the voltages at the first and second output nodes 102a and 102b (on average over the course of the switching cycle) provide the desired differential output signal. For a higher magnitude signal, one of the switching drivers may, instead, operate in the indirect-coupled mode and switch the relevant output node between the voltage +2VP and +VP, whilst the other switching driver remains operating in the direct-coupled mode, switching the output node between +VP and 0V. It can therefore be seen that, in this example, the driver apparatus 100 is operable in two different BTL modes, a mode, which will be referred to as Mode 0, in which both switching drivers (103a and 103b) switch between +VP and 0V and another mode, which will be referred to as Mode 1, in which one switching driver (103a or 103b) switches between +2VP and +VP whilst the other switching driver (103b or 103a) switches between +VP and 0V.

Conventionally, in a BTL driver apparatus, the first and second drive signals on either side of the load may be controlled to vary oppositely and equally with the input signal level for a given BTL operating mode. That is, any change in input signal level (within a given BTL mode) would result in a change in value of the first drive signal which is equal and opposite to that of the second drive signal. For the case where the difference between the relevant switching voltages used on either side of the load is equal (e.g. where each output node is switched between two voltages that differ by an amount equal to +VP) the means that any change in modulation index of the first switching driver will be equal and opposite to any change in modulation index of the second switching driver.

Figure 3A:
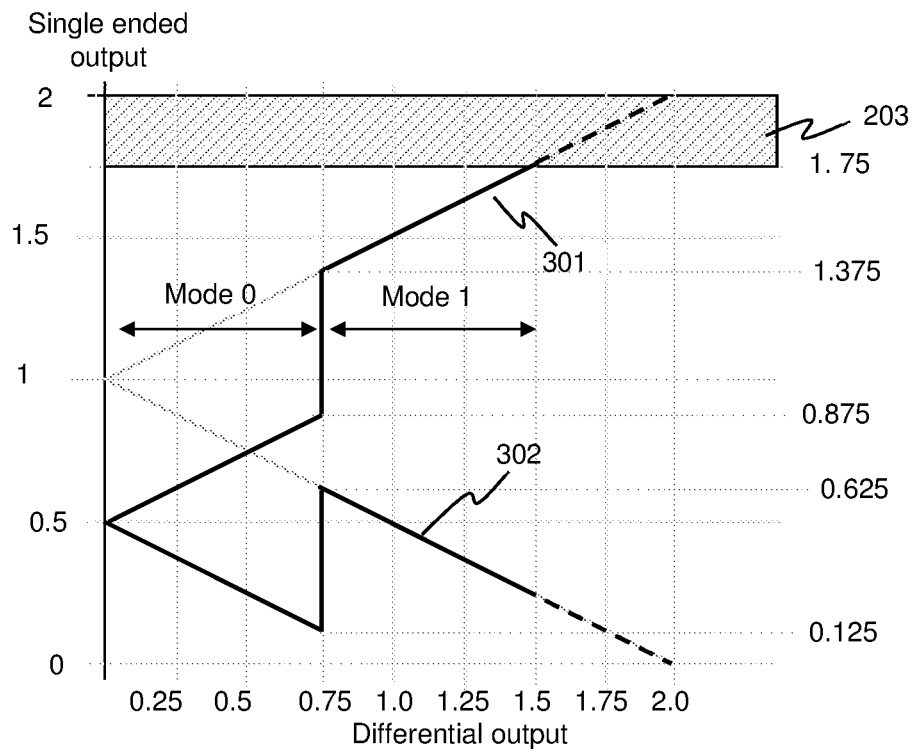
FIGS. 3*a*, 3*b* and 3*c* illustrate different modes of operation of a multi-level converter circuit.

FIG. 3a illustrates such operation. FIG. 3a illustrates first and second drive signals 301 and 302, i.e. the output of the first and second switching drivers on average over the course of the switching cycle, and how they may vary with the differential output signal over a range of 0V to +2VP. Note FIG. 3a shows the relevant signals in terms of normalised units of +VP.

FIG. 3a illustrates that for a differential output signal of zero, the driver apparatus 100 operates in the BTL Mode 0 with both first and second switching drivers 103a and 103b switching between the voltages +VP and 0V. For a differential output of zero, both switching drivers may have a modulation index of 0.5, where the modulation index represents the proportion of the switching cycle where the relevant output node is connected to the higher switching voltage. As the required differential output signal increases, the modulation index of the first switching driver 103a increases, with a corresponding equal and opposite change in the modulation index of the second switching driver 103b. The first and second drive signals 301 and 302 thus vary symmetrically about a fixed value (0.5VP in this example) in this BTL Mode 0. In BTL Mode 0, it can be seen that the weighting of the first and second drive signals 301 and 302 is equal and opposite, in that the gradient of the plots of how the first and second drive signals 301 and 302 vary with signal magnitude are equal and opposite. In other words, the gains of the first and second drive signals (for any change in input signal and hence the output differential signal) have equal magnitude. A first gradient for the plot of the first drive signal 301 is +0.5 and a second gradient for the plot of the second drive signal 302 is −0.5. The overall gain of the driver apparatus 100 is equal to the first gradient minus the second gradient which is +0.5−(−0.5)=1.

In theory, the driver apparatus could operate in BTL Mode 0 up to a differential voltage of +VP. However, there may be some practical difficulties with implementing very high duty cycles near (but not at) 100% and likewise very low duty cycles near (but not at) 0%, so it may be advantageous in some implementations to change the BTL mode of operation at a lower magnitude so as to avoid the need to utilize such high or low duty cycles. FIG. 3a illustrates that, in this example, at a differential output signal level of 0.75VP, the driver apparatus changes to the BTL Mode 1 operation, and the first switching driver 103a starts switching between the voltages +2VP and +VP in the indirect-coupled switching mode. As the first switching driver is now switching between the voltages +2VP and +VP, the value of the first driver signal 201 will increase to at least +VP, and preferably to a value greater than +VP to avoid a very low duty cycle. To maintain the correct differential voltage, the duty cycle of the second switching driver, which remains switching between +VP and 0V, is increased by a corresponding amount. In the example of FIG. 3a, each of the first and second drive signals 301 and 302 is increased by an amount equal to 0.5VP, so that the first and second drive signals become symmetrical about +VP. In the BTL Mode 1 operation, any further increase in signal level may again result in an equal and opposite change in the first and second drive signals 201 and 202, so these drive signals vary symmetrically about +VP. In this Mode 1, the gains of the first and second drive signals are thus of equal magnitude.

However, as discussed above, in the BTL Mode 1 operation, the output impedance of the first switching driver 103a, which is operating in the indirect-coupled mode of operation, has a duty-cycle dependence and can become relatively high at high duty-cycles for the first switching driver. Thus, there may be a region of operation, illustrated as region 303, corresponding to a duty-cycle for the first switching driver above a certain limit, which it is desirable to avoid. In the example of FIG. 3a, the duty-cycle limit for the first switching driver is 75% and so this region corresponds to a level of the first drive signal 301 of 1.75VP. It can be seen from FIG. 3a, that this limit is reached at a differential output of 1.5VP. Therefore, in this example, the driver apparatus may be controlled so as to not exceed a differential output signal of magnitude greater than 1.5VP.

Embodiments of the present disclosure may use a different modulation scheme when operating in the BTL Mode 1 to reduce the impact of a high output impedance arising from a high duty cycle for the driver operating in the indirect, AC-coupled, switching mode.

Figure 3B:
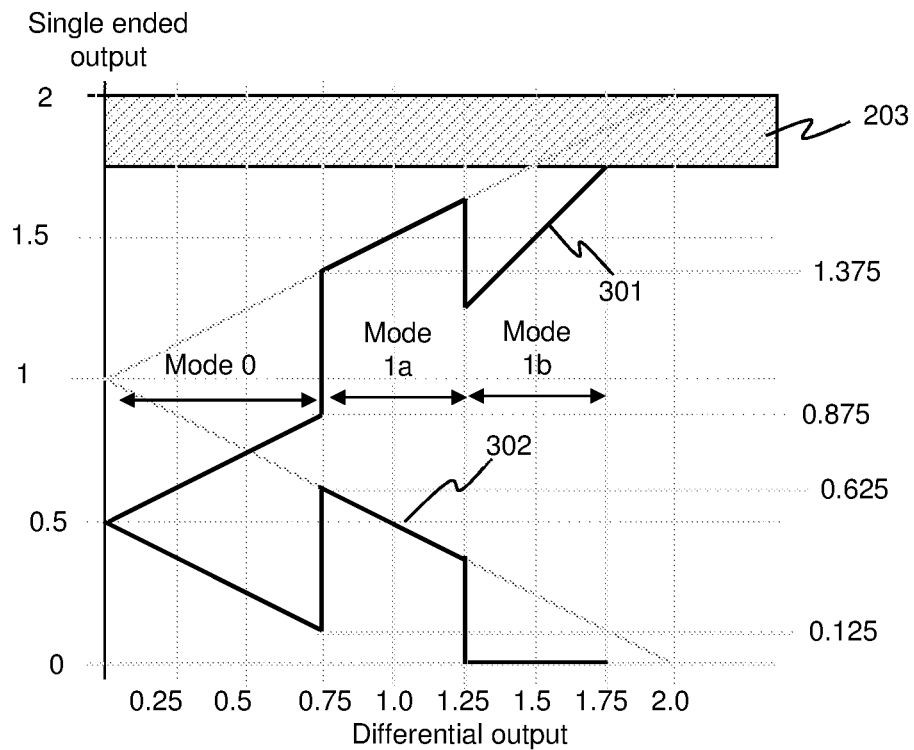

There are various ways in which the modulation scheme may be varied. FIG. 3b illustrates one example, which illustrates the first and second drive signals 301 and 302 in a similar manner as FIG. 3a.

In the example of FIG. 3b, the driver apparatus 100 may, like the example of FIG. 3a, operate in the BTL Mode 0 for differential output signals in the range of 0V to 0.75VP, with the first and second drive signals 301 and 302 varying equally and oppositely, i.e. symmetrically about 0.5VP. At the differential output signal level of +0.75, the driver apparatus may switch to BTL Mode 1 operation, with the first switching driver 103a operating in the indirect, AC-coupled, switching mode to switch between +2VP and +VP, with the second switching driver 103b operating in the direct, DC-coupled, switching mode to switch between +VP and 0V. When switching to the BTL Mode 1 operation, the first and second drive signals may both be increased by the same amount to maintain the correct differential voltage, and in this example the first and second drive signals are increased to be equally spaced either side of a voltage +VP, in a similar manner as discussed with reference to FIG. 3a.

In this case, however, the BTL Mode 1 operation may be divided into two BTL sub-modes. In a first BTL sub-mode, referred to herein as Mode 1 a, any further increase in signal level may again result in an equal and opposite change in the first and second drive signals 301 and 302, so these drive signals vary symmetrically about +VP. Mode 1a is thus essentially the same as Mode 1 discussed with respect to FIG. 3a. As noted above, the increase in the level of the first drive signal 301 will involve the modulation index or duty-cycle of the first switching driver increasing, with an increase in output impedance. At a certain signal level, in this example at a differential output signal level of 1.25VP, the driver apparatus swaps to a mode, referred to herein as Mode 1b, where the second switching driver 103b is controlled so as to maintain the second output node 102b at the voltage 0V throughout the whole of its switching cycle. In effect, in the Mode 1b operation, the output node 102b of the second switching driver 103b is continually connected to ground and the modulation index of the second switching driver is effectively zero. This transition from Mode 1a to Mode 1b effectively provides a step change in the value of the second drive signal 202, in this example by an amount equal to 0.375VP. To maintain the correct differential output signal, the value of the first drive signal 301 is also reduced by a corresponding amount, with a consequent reduction in modulation index for the first switching driver 103a and hence a significant reduction in the effective output impedance. In embodiments of the present disclosure, the modulation of the first switching driver may also be controlled to maintain a substantially constant modulation frequency for the differential output signal on the transition from Mode 1a to Mode 1b (or vice versa) as will be discussed in more detail below.

For any further increase in signal level, the value of the first drive signal 301 alone is varied and the second driver signal 302 is maintained at 0V. Thus the effective gain for the second drive signal 302 is zero, i.e. the second gradient for the plot of the second drive signal and how it varies with differential output signal in Mode 1b is zero. In this case, to maintain the correct overall gain for the driver apparatus 100 in this Mode 1b, the first gradient for the plot of the first drive signal 301 and how it varies with differential output signal in Mode 1b is equal to 1. The value of the first drive signal 301 can be increased up to the limit of the region 303, which in this case occurs at a differential output signal level of 1.75VP. It can thus be seen that operation in the Modes 1a and 1b allows the first switching driver, which is operating in the indirect, AC-coupled, switching mode with a duty-cycle dependence, to operate with a lower duty-cycle for a greater range of input signal level (and hence differential output signal level) and for the driver apparatus to be able to output a greater magnitude differential output signal than would be the case for the example of FIG. 3a.

Figure 3C:
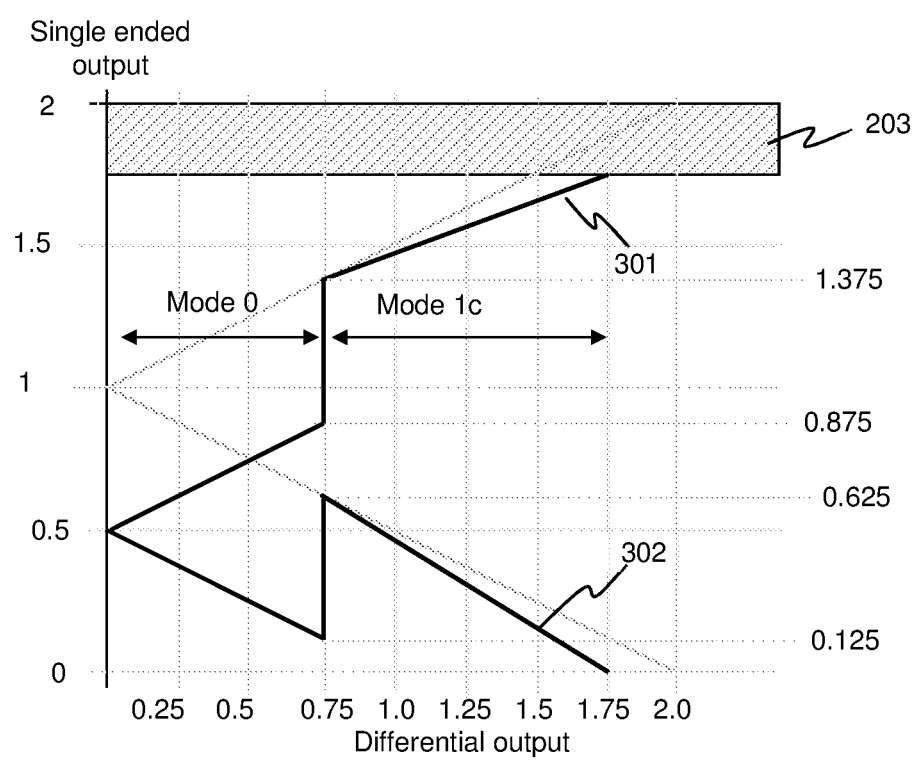

FIG. 3c illustrates a further example of a different modulation scheme, which illustrates the first and second drive signals 301 and 302 in a similar manner as FIGS. 3a and 3b.

In the example of FIG. 3c, the driver apparatus may operate in the BTL Mode 0 for differential output signals in the range of 0V to 0.75VP, with the first and second drive signals 301 and 302 varying equally and oppositely and may switch to a BTL Mode 1 operation at differential output signal level of +0.75, in the same manner as the examples of FIGS. 3a and 3b. However, in the example of FIG. 3c, the driver apparatus 100 may operate in a mode which will be referred to as Mode 1c in which the first and second drive signals 301 and 302 both vary with input signal (and hence with the differential output signal), but where the gains of the first and second drive signals 301 and 302 are of different magnitude to one another, i.e. the first gradient is of a different magnitude to the second gradient.

FIG. 3c illustrates that, when operating in Mode 1b, the magnitude of the first gradient for the first drive signal 301 is lower than the magnitude of the second gradient for the second drive signal 302. In other words, for a given change in the required differential output signal, there is a greater change in the level of the second drive signal 302 than for the first driver signal 301. This lowers the rate at which the level of the first drive signal 301, and hence the modulation index of the first switching driver, increases with any increases in the input (and hence differential output) signal, compared to the example of FIG. 3a, and hence reduces the rate at which the effective output impedance of the first switching driver increases. Again, this allows the driver apparatus 100 to operate with a lower duty-cycle for a greater range of input signal level (and hence differential output signal level) and for the driver apparatus to be able to output a greater magnitude differential output signal than would be the case for the example of FIG. 3a.

The first gradient of the plot of the first drive signal 301 may have a value a, which in this case may be positive and with a non-zero magnitude lower than 0.5. To maintain the overall gain of the driver apparatus equal to 1 in the Mode 1 c operation, the second gradient of the plot of the second drive signal 302 may have a value equal to 1−α. The value of α may be selected for a particular application to provide a desired operating range. For instance, in the example of FIG. 3c, the value of a is 0.375 and the second gradient is 1−α=−0.625. As can be seen from FIG. 3c, this means that the first driver signal 301 reaches the region 303 of high-output impedance at a differential output signal level of 1.75VP. However, as illustrated in FIG. 3c, this would require the signal level of the second drive signal to vary all the way down to 0V, which would thus require some very low duty cycles for the second switching driver. As noted above, it may be preferable to avoid low duty cycles near 0%, and thus it may be preferable for the modulation index for the second switching driver to go no lower than a lower limit, say no lower than 0.125 for example. In which case the maximum differential output signal may be lower than 1.75VP, but it may still be greater than 1.5VP in the example of FIG. 3a, and in general the output impedance at any given output signal level in the Mode 1c operation may be lower than the mode 1 operation described with reference to FIG. 3a.

FIG. 3c illustrates Mode 1c as an alternative to the Mode 1a and Mode 1b operation of FIG. 3b, however it should be understood that Mode 1c operation could be implemented as a sub-mode along with some operation in one or both of Modes 1 a and 1 b. For instance, with reference to FIG. 3b, the driver apparatus could operate in Mode 1c (with uneven gains for the drive signals) instead of in Mode 1 a with the even gains.

All of the examples of 3a-3c show the variation in the first and second drive signals for a positive differential output signal (assuming that a positive differential output signal corresponds to the first drive signal 301 being more positive than the second drive signal 302). It will be understood that that for negative differential outputs in the same magnitude range, the values of the first and second driver signals could be inverted, with the second switching driver operating in the indirect, AC-coupled, mode of operation with operating in mode 1 or any of the mode 1 variants mode 1 a, mode 1 b and mode 1c.

In both of the examples of FIGS. 3b and 3c, the driver apparatus operates, for a certain range of differential output signal (and hence for a corresponding range of input signal), in some variant of Mode 1, where the first switching driver operates with AC-coupled switching and the second switching driver operates with DC-coupled switching and, for at least part of this range, any variation in input signal level results in a change in the modulation index for the first switching driver which is different in magnitude to the change in modulation index of the second switching driver. That is, for part of the relevant range, a change in input signal level results in a change in level of the first drive signal which is different to the change in the level of the second drive signal, i.e. the gains are unequal. For the example of FIG. 3b, this occurs for the Mode 3b operation, where a change in level of the input signal results in a change in modulation index for the first switching driver, but the modulation index of the second switching driver remains at zero. For the example of FIG. 3c, operation in Mode 1 c, with different gradients for the first and second drive signals, means that a change in input signal result in a change of modulation index of the first switching driver which is less than the change in modulation index for the second switching driver.

It will be understood that when operating in Mode 1b or Mode 1 c, because the first and second drive signals vary unsymmetrically with input signal level, the common-mode component of the differential output will also vary with input signal.

As noted above, embodiments of the present disclosure may also maintain a substantially constant modulation frequency for the differential output signal, even if operating in Mode 1b, with the output of one of the switching drivers held constant. As will be understood by one skilled in the art, when operating in Mode 1a (or Mode 1c), the voltages at both the first and second output nodes 102a and 102b are modulated between two different values over the course of a switching cycle. Generally each switching driver may be controlled by suitable PWM modulators and each output node may be controlled so as to have one low-to-high transition and one high-to-low transition in each switching cycle period. The resultant differential output signal may, as a result have two low-to-high transitions and two high-to-low transitions per switching cycle, and thus the modulation frequency of the differential output signal is effectively twice that of each of the first and second drive signals. When switching to Mode 1b, the output of one of the switching drivers, e.g. the second switching driver 103b, is held constant throughout the whole of the switching cycle, and thus the modulation of the differential output arises from the modulation of the output of the other switching driver, e.g. the first switching driver 103a. If that switching driver were driven by the same PWM modulator, with one low-to-high transition and one high-to-low transition in each switching cycle period, the resultant differential output signal would also just have one low-to-high transition and one high-to-low transition in each switching cycle period and thus the modulation frequency of the differential output signal would appear to reduce by a factor of two when switching from Mode 1a to Mode 1b (or double when switching from Mode 1b to Mode 1a). However, it would be necessary to reconfigure the relevant PWM modulator to provide the correct duty cycle and gain, which may be relatively complex.

In at least some applications it may be beneficial for performance reasons for the modulation frequency of the differential output signal to remain substantially constant and/or it may be more convenient to use signals from both PWM modulators to control one of the switching drivers in Mode 1b operation. Therefore, when operating in Mode 1b, the modulation frequency of the relevant switching driver may be increased, e.g. doubled, so as to provide a constant modulation frequency for the differential output signal in the different BTL modes of operation.

Figure 4:
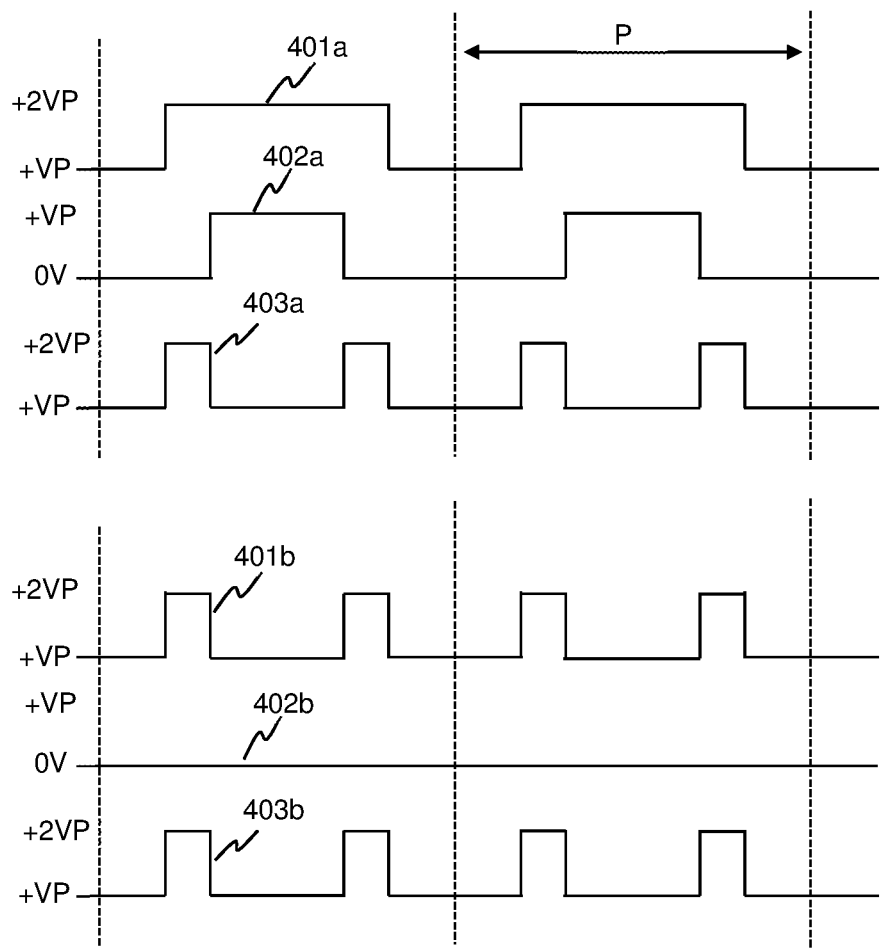
FIG. 4 illustrates one example of switching waveforms for switching between different modes.

FIG. 4 illustrates this principle. The top part of FIG. 4 illustrates the switching waveform 401a at the first output node 102a, the waveform 402a at the second output node 102b and the resultant differential waveform 403a when operating in Mode 1a as discussed with reference to FIG. 3b. As can be seen, the voltage at the first output node 102a is modulated between +2VP and +VP with one low-to-high transition and one high-to-low transition in each switching cycle period P. Likewise, the voltage at the second output node 102b is modulated between +VP and 0V with one low-to-high transition and one high-to-low transition in each switching cycle period P. This results in the differential output 403a that has two low-to-high transitions and two high-to-low transitions in each switching cycle period P.

The lower part of FIG. 4 illustrates the switching waveform 401b at the first output node 102a, the waveform 402b at the second output node 102b and the resultant differential waveform 403b when operating in Mode 1b as discussed with reference to FIG. 3b. In this case the voltage at the second output node 102b is held at 0V throughout the switching cycle period. To ensure that the modulation frequency of the differential output 403b remain the same as for the Mode 1a operation, the switching frequency at the first output node 102a is doubled so as to provide two low-to-high transitions and two high-to-low transitions in each switching cycle period P, but with the correct overall modulation index.

This can be achieved using the switching control signals that would, in Mode 1 a operation, be used to control switching of the second switching driver to instead control the first switching driver in the Mode 1b operation. From the top part of the FIG. 4 it will be understood that, in Mode 1 a operation in this example, a first set of control signals will control switching of the first switching driver to provide the low-to-high transition and the subsequent high-to-low transition and a second set of control signals will likewise control switching of the second switching driver, e.g. each switching driver may be switched based on respective PWM signal. In the Mode 1b operation, the second switching driver holds the relevant output node at 0V and the second set of control signals can instead be used to trigger a high-to-low transition of the first switching driver with a subsequent transition low-to-high transition, i.e. both the first and second PWM signals are used to control switching of the first switching driver. This provides the correct duty-cycle and maintains a constant modulation frequency for the differential output signal without requiring any change in the way that the first and second PWM signals are generated when switching between Mode 1a and Mode 1b.

Figure 5A:
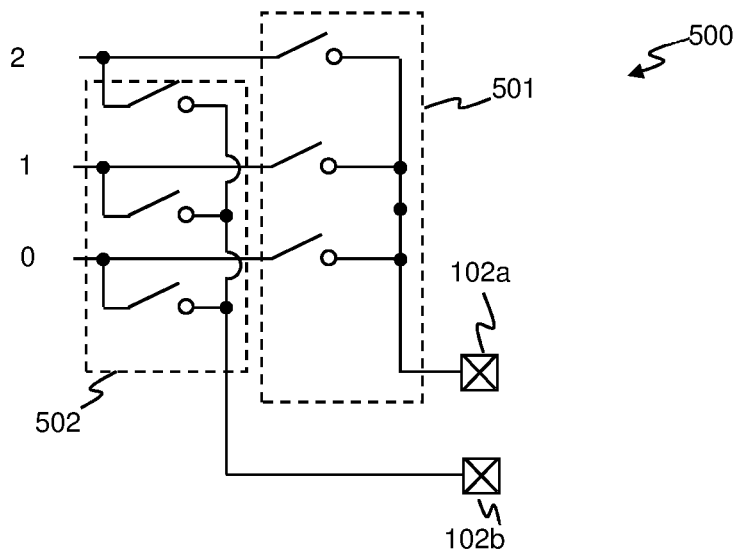
FIGS. 5*a*, 5*b*, 5*c*, and 5*d* illustrate another example of operation of a multi-level converter circuit.
Figure 5B:
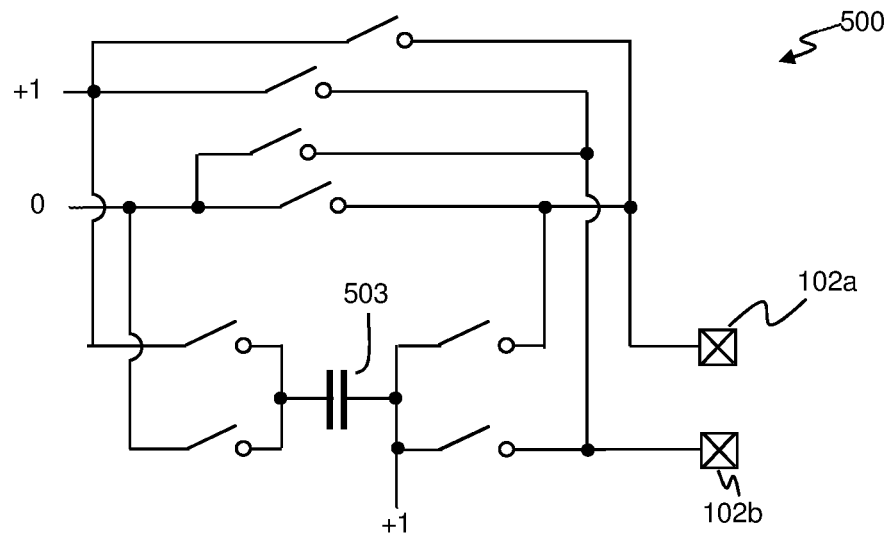

FIGS. 5a-5d illustrate another example of a driver apparatus 500 according to an embodiment. FIG. 5a illustrates that the driver apparatus may comprise first and second switching drivers 501 and 502 for selectively switching the first output node 102a and the second output node 102b respectively between three voltage levels, 0, 1 or 2. The voltage levels 0 and 1 may be continuous voltage levels, i.e. provided by DC-coupled paths. Voltage level 2 may be provided by AC-coupled switching, for instance by an AC coupled path comprising a flying capacitor 503, which can be charged between the voltage levels 1 and 0, and then connected to provide voltage boosting, as illustrated in more detail in FIG. 5b.

Figure 5C:
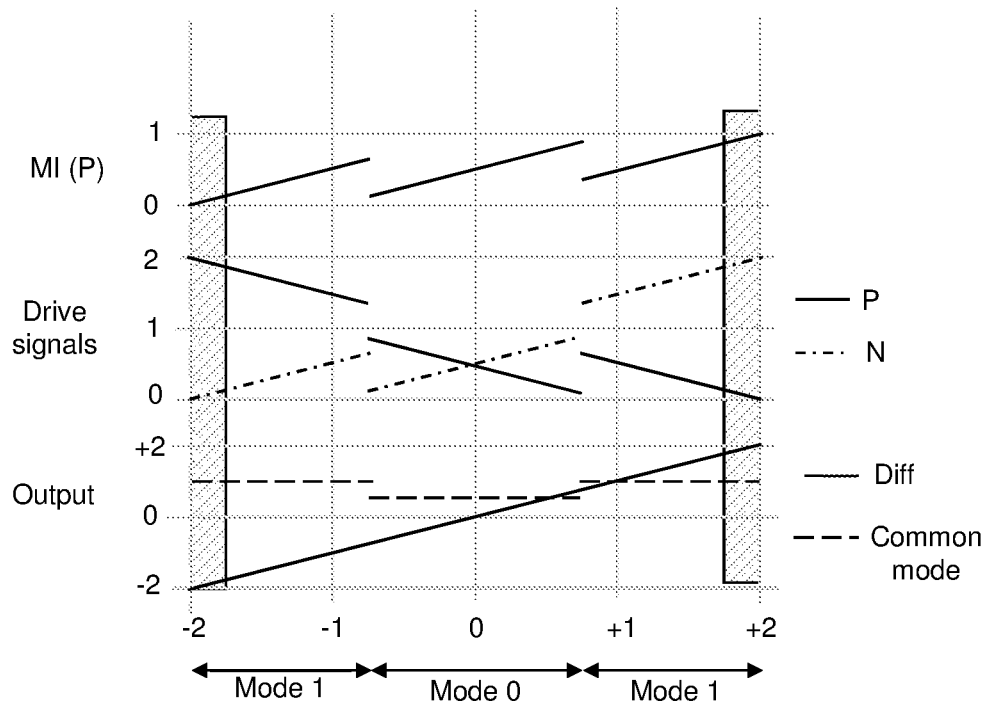
Figure 5D:
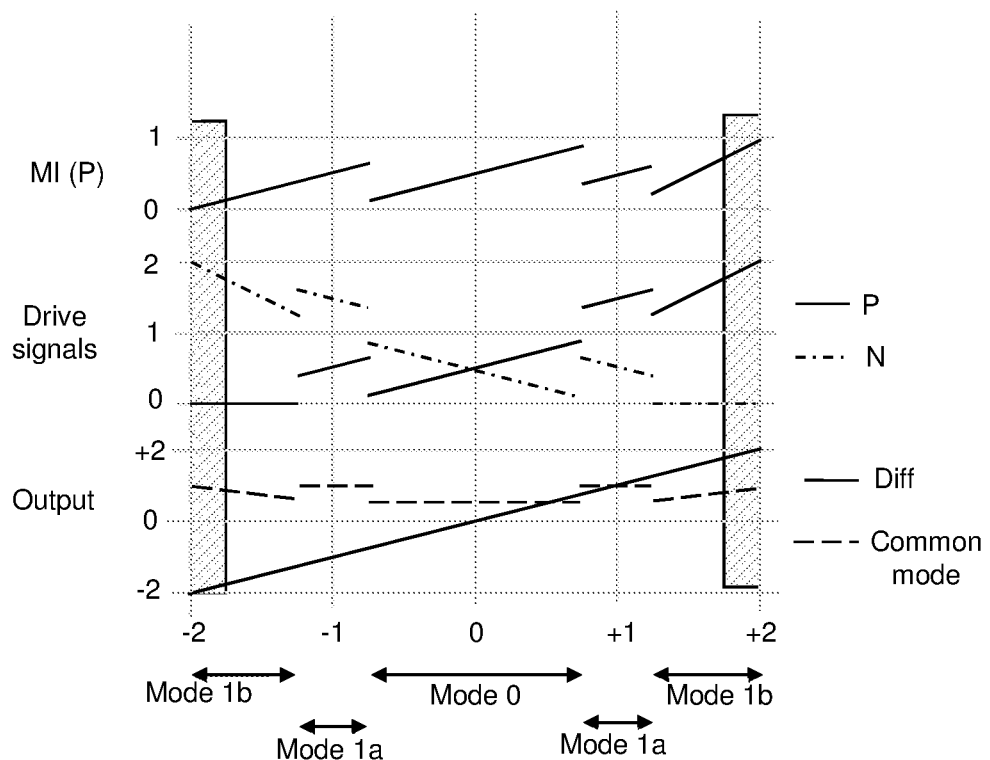

FIG. 5c illustrates how the individual positive and negative drive signals (which may be the first and second drive signals respectively) may vary across the operating range of differential output, from −2 to +2, with operation in Mode 0 and Mode 1 in a similar manner as discussed with reference to FIG. 3a and also the modulation index (MI) for the positive drive signal. FIG. 5c also shows the differential output and the common-mode voltage component of the differential output. It can be seen that the common-mode voltage component varies between Mode 0 and Mode 1, but in this example is constant within a given mode of operation. FIG. 5d illustrates instead how the individual positive and negative drive signals (which may be the first and second drive signals respectively) may vary across the operating range of differential output, from −2 to +2, with operation in Mode 0 and in Modes 1 a and 1 b in a similar manner as discussed with reference to FIG. 3b, for instance with switching waveforms for operation in Mode 1a and Mode 1b such as discussed with reference to FIG. 4. In this case, it can be seen that the common-mode voltage varies between Mode 0 and Mode 1 a, but is against constant in the relevant mode or sub-mode. However, in Mode 1b, the common-mode voltage varies with signal level.

Figure 6:
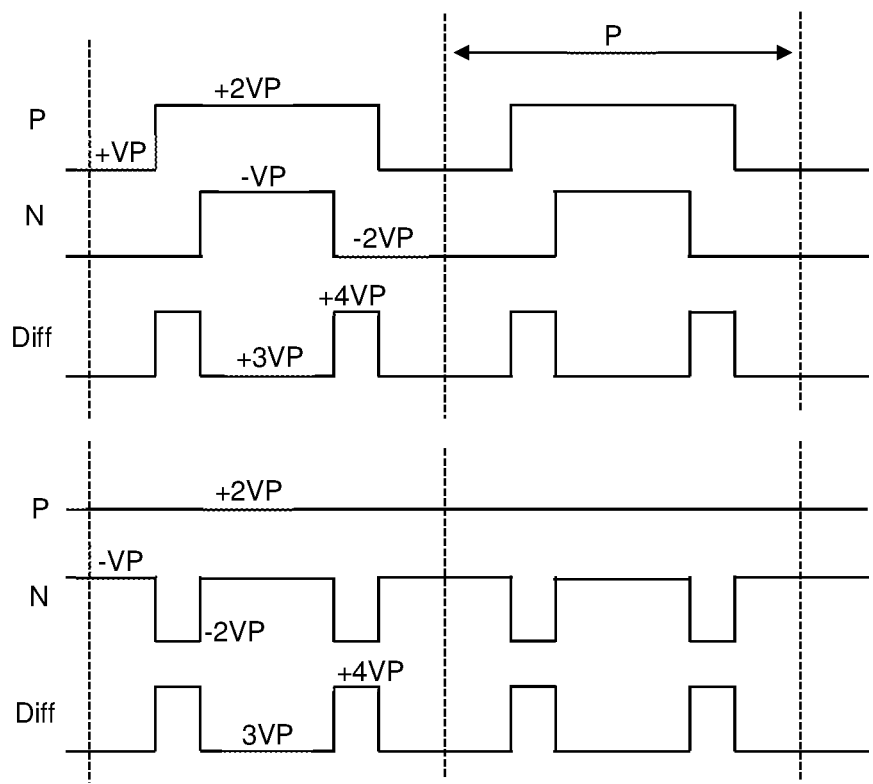
FIG. 6 illustrates example waveforms for different modes of operation in another example.

FIG. 6 illustrates another example of possible output voltages and switching waveforms for a multi-level converter comparing operation in Mode 1 a and Mode 1b. FIG. 6 illustrates an example where four voltages are used, +2VP, +VP, −VP and −2VP. In this example, the voltages +2VP and +VP are continuous DC voltages and a P driver signal is generated by switching one side of the load between these two DC voltages in a DC-coupled mode of operation. In this example, the voltages −VP and −2VP are generated by an AC-coupled switching path and thus are generated by switching the other side of the load in an indirect, AC-coupled, switching mode to provide an N drive signal.

Figure 7:
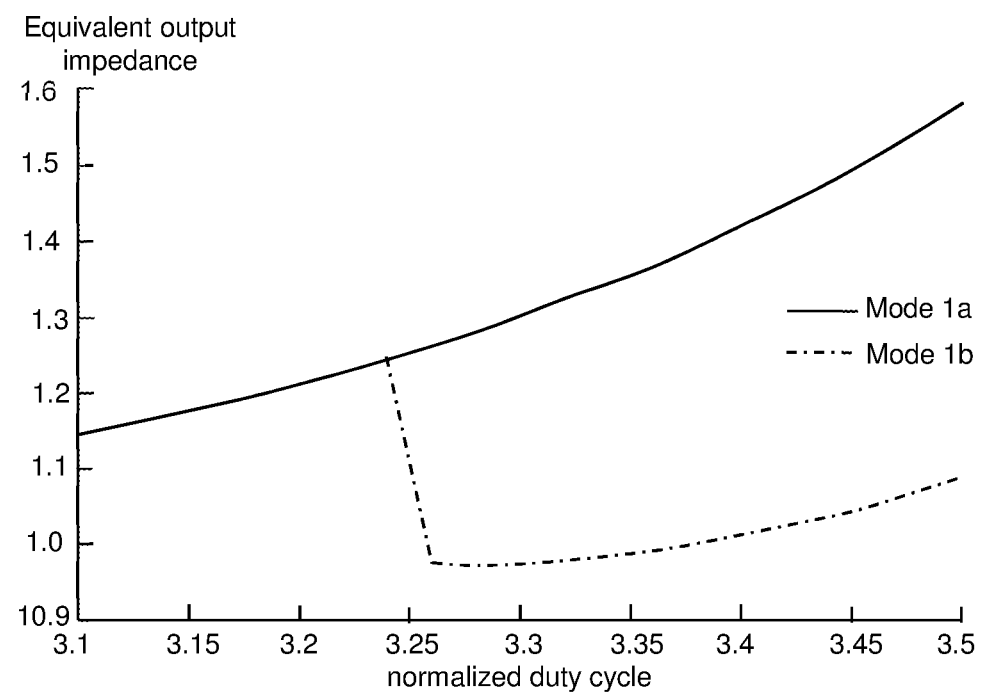
FIG. 7 illustrates the equivalent output impedance for the different modes illustrated in FIG. 6.

To provide a differential output of, say, +3.5VP in Mode 1 a, the P drive signal toggles between the voltage +2VP and +VP with a duty cycle of 75%, i.e. a modulation index of 0.75, with the N signal toggled with a duty cycle of 25% (for proportion of time spent in the high state −VP, so a duty-cycle of 75% for proportion of time spent at the voltage −2VP which corresponds to a transfer phase of the AC-coupled switching), as illustrated in the top waveforms of FIG. 6. This results in the equivalent output impedance being relatively high. To reduce the sensitivity, i.e. to reduce the effective output impedance, whilst providing the same differential output, the driver apparatus may instead operate in Mode 1b, as illustrated in the lower set of waveforms. In this case, the P drive signal is held at the voltage +2VP throughout the switching cycle, which corresponds to a duty cycle of 100%. To compensate, the N signal toggled between the voltages −VP and −2VP with an increased 50% duty cycle (for the voltage −VP), which reduces the duty-cycle for the voltage −2VP of the transfer phase and which thus reduces the equivalent output impedance. FIG. 7 illustrates the equivalent output impedance for operation in Mode 1a and Mode 1b and illustrates that there is a clear advantage in terms of reduced output impedance in operating in the Mode 1 a, with the unbalanced or unsymmetrical modulation weighting of the drive signals.

Figure 8:
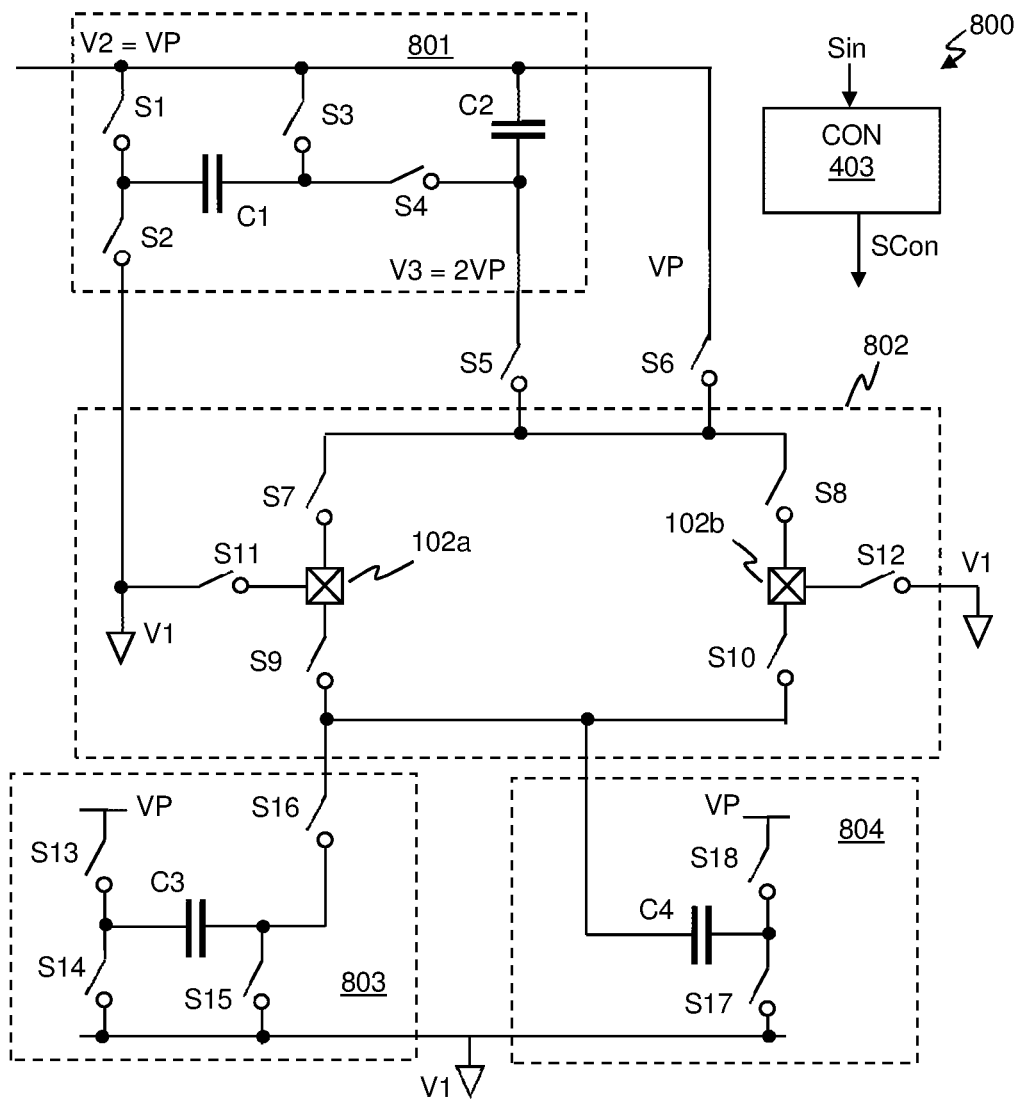
FIG. 8 illustrates another example of a driver apparatus according to an embodiment.

FIG. 8 illustrates a further example of a multi-level converter 800 according to an embodiment. FIG. 8 illustrates that the converter 800 receives systems voltages V1 and V2, which in this example are ground and a supply voltage VP. The driver apparatus comprises a 2× (times two) charge pump 801, which receives the system voltages VP and ground, and which generates a further supply voltage V3, which in this example is equal to 2VP. The charge pump 801 comprises a capacitor C1 arranged as a flying capacitor with switches S1, S2, S3 and S4 to generate the voltage V3, and a reservoir capacitor C2 that maintains the voltage V3.

The converter 800 also comprises a differential output bridge 802 for the output nodes 102a and 102b. In the example of FIG. 8, the 2VP output voltage from the charge pump 801 or the system voltage VP may be respectively coupled to a common-rail, which may be referred to as a high-side rail by switches S5 and S6 respectively. Each of the output nodes 102a and 102b may be selectively connected to the high-side rail by respective switches S7 and S8. The output nodes 102a and 102b can also be selectively connected to a low-side rail by respective switches S9 and S10, or to the system ground voltage by respective switches S11 and S12. The output bridge 802 may thus be referred to as a T-bridge.

The driver apparatus also comprises a flying capacitor auxiliary driver 803 with a flying capacitor C3. In this example, switches S13 and S14 selectively connect a first terminal of capacitor C3 to the system voltage VP or ground respectively, and switch S15 selectively connects the second terminal of capacitor C3 to ground.

The embodiment of FIG. 8 also includes a second flying capacitor auxiliary driver 804, which comprises switches S17 and S18 and capacitor C4, which is also connected to the low-side rail. The second flying capacitor auxiliary driver 804 can be implemented so as to operate, together with the first flying capacitor auxiliary driver 803, to generate a further different boosted voltage so as to extend to the output voltage range of the driver apparatus 400. In some implementation, however, this further different boosted voltage may not be required and the second flying capacitor auxiliary driver 804 may be omitted.

In use, the various switches S5 to S18 of the driver apparatus are controlled by a controller 805 based on an input signal Sin, for example an input audio signal, to generate a corresponding differential output signal. The controller 805 may be configured to operate the driver apparatus selectively in different modes of operation to provide a differential output voltage in the range of +4VP to −4VP based on the input signal Sin as discussed above.

Figure 9:
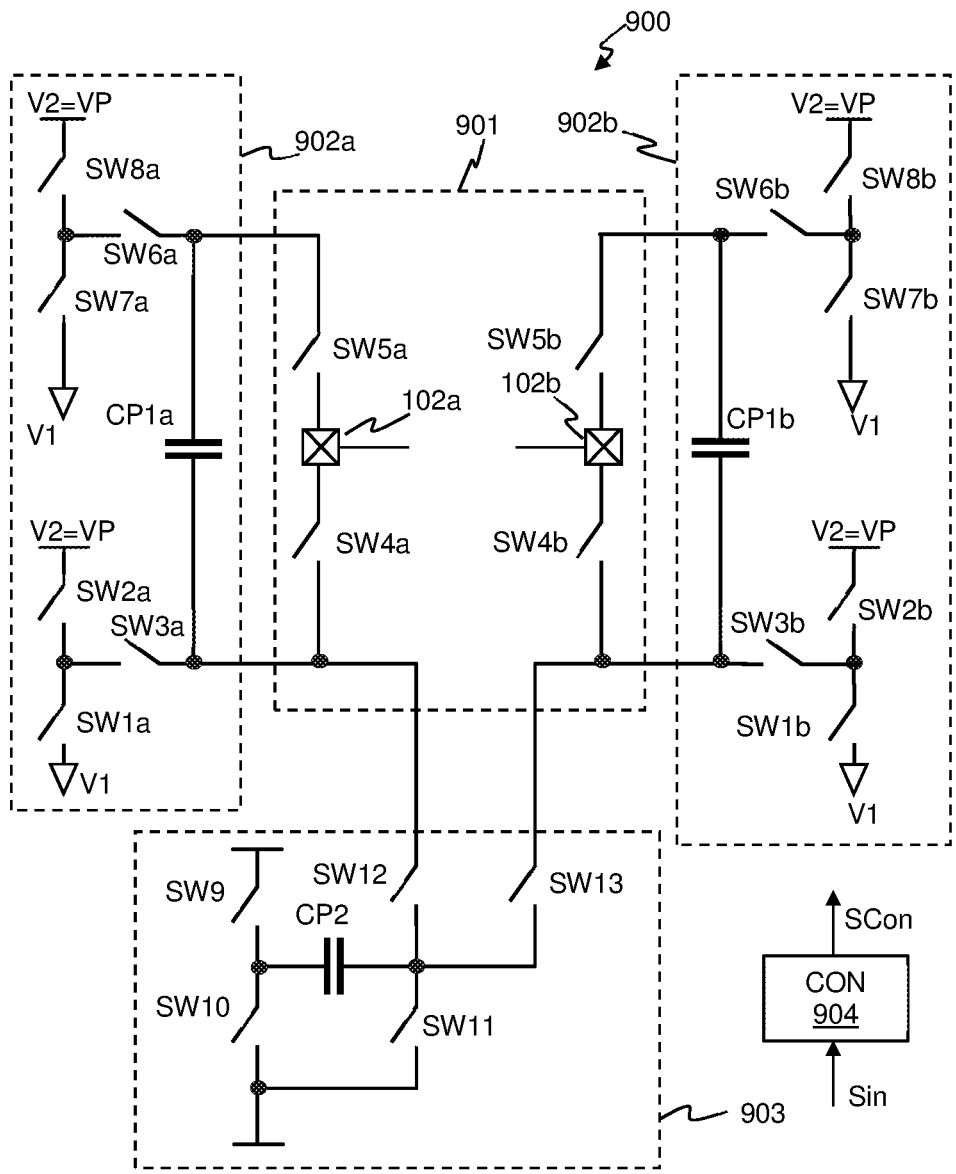
FIG. 9 illustrates a further example of a driver apparatus according to an embodiment.

FIG. 9 illustrates an example of a driver apparatus 900 according to another embodiment.

The embodiment of FIG. 8 comprises a differential driver for driving output nodes 102a and 102b. The embodiment of FIG. 9 receives systems voltages V1 and V2, which in this example are ground and a supply voltage VP.

The driver apparatus 900 comprises an output stage 901 for driving the output nodes 102a and 102b. The output stage 901 in this embodiment comprises switches SW5a and SW5b for selectively connecting the output node 102a to respective high-side and low side-rails for the output node 102a. Likewise switches SW4b and SW5b selectively connect the output node to high-side and low-side rails for output node 202b. The output stage 901 in this example may thus be seen as an H-bridge.

A first driver 902a is operable to provide voltages for the high-side and low-side rails for output node 102a. The driver 902a comprises a capacitor CP1a coupled between the high-side and low-side voltage rails. A switch SW6a selectively couples the high-side voltage rail to a voltage select node which can be selectively connected to either of the system voltages V1 or V2, i.e. ground and VP in this example, by switches SW7a and SW8a. Likewise, SW3a selectively couples the low-side voltage rail to a voltage select node which can be selectively connected to either of the system voltages V1 or V2 by switches SW1a and SW2a.

In use, the driver 902a can supply the system voltages V2 and V1 as voltages to the high-side and low-side rails for DC-coupled switching. In addition, the driver 902a can selectively connect the capacitor CP1a in series with one of these supply voltages to provide positive or negative boosting of the relevant supply voltage to provide an indirect (or AC coupled) switching voltage.

A second driver 902b is coupled to the high-side and low-side rails for the output node 102b. The driver 902b has generally the same structure as the driver 902a and thus has components corresponding to those of the driver 902a (identified by the same reference but with the suffix b in FIG. 8).

The driver apparatus 900 also comprises a charge pump 903. The charge pump 903 is configured to be operable to provide a supply voltage to, in this example, the low-side rail for either of the output nodes 102a or 102b. The charge pump driver 903 comprises a capacitor CP2 and switches S9 and S10 for selectively connecting a first terminal of capacitor CP2 to either of the system voltages V2 or V1, and switch SW11 for selectively connecting a first terminal of capacitor CP2 to V1, i.e. ground in this example. Switches SW12 and SW13 selectively connect the charge pump driver to the low-sides rails for output nodes 102a and 102b respectively. In use, when the charge pump 903 is active to supply a voltage to one of the low side rails, the respective capacitor CP1a or CP2b connected to that voltage rail may be used as a reservoir capacitor, as will be discussed in more detail below.

In use, the various switches of the driver apparatus are controlled by a controller 9904 based on an input signal Sin, for example an input audio signal, to generate a corresponding differential output signal. The controller 904 may be configured to operate the driver apparatus selectively in different modes of operation to provide a differential output voltage in the range of +3VP to −3VP based on the input signal Sin. The controller 904 thus receives the input signal Sin and generates a series of switch control signals Scon for controlling the switches.

Embodiments of the disclosure thus relate to driver apparatus that operates with a multi-level switching voltages and which operates with a mixed direct-coupled and indirect-coupled energy transfer, wherein in a BTL mode of operation where one side of the load is switched in a DC-coupled mode and the other side of the load is switched in an AC-coupled mode, the weighting or gain of the two drive signals on either side of the load may be different in magnitude, so as to reduce the impact of the duty-cycle impedance variation when operating in an AC-coupled switching mode.

Embodiments relate to a multi-level class D amplifier having a mix of DC coupled and AC coupled paths with three or more output levels (e.g. A, B, C). The amplifier provides a differential output having a first and second drive signals, e.g. a P signal and an N signal. The amplifier may be operable with a modulation scheme wherein the first and second drive signals, the P signal and the N signal, both switch in approximate mirror symmetry. The amplifier may also be operable with a modulation scheme where the first and second drive signals, e.g. the P signal and N signal, both switch with an unsymmetric slope or weighting. Additionally or alternatively the amplifier may be operable with a modulation scheme where one of the first and second drive signals, e.g. one of P and N signals, is fixed and the other one of the first and second drive signals, i.e. the other of the P and N signals, modulates.

In one mode, one drive signal may be fixed at one of the output levels (A,B,C) and the other drive signal may switch between two of the output levels (A,B,C) and is not fixed. The fixed signal may be DC coupled and the switching signal may be AC coupled. In one mode, the first and second drive signals, i.e. the P signal and N signal both switch in unsymmetric slope or weighting. This results in further optimization of an impedance of the multi-level class D amplifier and in better amplifier efficiency and output power.

The driver apparatus of embodiments of the disclosure may be suitable for driving an output transducer. The output transducer may be, in some implementations, be an audio output transducer such as a loudspeaker or the like. The output transducer may be a haptic output transducer. In some implementation the output transducer may be driven in series with an inductor, i.e. there may be an inductor in an output path between an output node of the switching driver and the load. In some implementations the transducer may be a piezoelectric or ceramic transducer.

Embodiments may be implemented as an integrated circuit. Embodiments may be implemented in a host device, especially a portable and/or battery powered host device such as a mobile computing device for example a laptop, notebook or tablet computer, or a mobile communication device such as a mobile telephone, for example a smartphone. The device could be a wearable device such as a smartwatch. The host device could be a games console, a remote-control device, a home automation controller or a domestic appliance, a toy, a machine such as a robot, an audio player, a video player. It will be understood that embodiments may be implemented as part of a system provided in a home appliance or in a vehicle or interactive display. There is further provided a host device incorporating the above-described embodiments.

The skilled person will recognise that some aspects of the above-described apparatus and methods, for instance aspects of controlling the switching control signals to implement the different modes, may be embodied as processor control code, for example on a non-volatile carrier medium such as a disk, CD- or DVD-ROM, programmed memory such as read only memory (Firmware), or on a data carrier such as an optical or electrical signal carrier. For some applications, embodiments may be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A driver apparatus configured to output first and second drive signals at respective first and second output nodes for driving a load connected between the first and second output nodes with a differential drive signal based on an input signal, the driver apparatus comprising:
   a first switching driver configured to modulate a voltage at the first output node with a first controlled modulation index to generate the first drive signal;
   a second switching driver configured to modulate a voltage at the second output node with a second controlled modulation index to generate second drive signal;
   wherein, for a level of the input signal within a first input range, the first switching driver is configured to modulate the voltage at the first output node by switchably connecting at least one flying capacitor into a signal path to the first output node and the second switching driver is configured to modulate the voltage at the second output node by controlling switching of the second output node between first and second DC voltages, wherein each of first and second voltages DC are maintained at a defined nominal voltage level throughout a switching cycle of the driver apparatus; and
   a controller for controlling the first and second switching drivers such that, if the input signal varies within said first input range, a constant modulation frequency of the differential drive signal is maintained and, for at least a first part of the first input range, a change in input signal level results in a change of the first controlled modulation index that has a different magnitude to any change in the second controlled modulation index.

2. The driver apparatus of claim 1 wherein the controller is configured such that, for said first part of the first input range, a change in input signal level results in an increase of the first controlled modulation index and a decrease in the second controlled modulation or vice versa, wherein the magnitude of change of the first controlled modulation index is lower than the magnitude of change of the second controlled modulation index.

3. The driver apparatus of claim 2 wherein said first part of the first input range comprises the whole of the first input range.

4. The driver apparatus of claim 1 wherein the controller is configured such that, for said first part of the first input range, the second switching driver maintains the second output node connected to one of first and second DC voltages throughout the switching cycle and a change in input signal level results in a change of the first controlled modulation index only.

5. The driver apparatus of claim 4 wherein the controller is configured such that, for a second part of the first input range, different to the first part, the second switching driver switches the second output node between the first and second DC voltages during the switching cycle and a change in input signal level results in an increase of the first controlled modulation index and a decrease in the second controlled modulation or vice versa.

6. The driver apparatus of claim 5 wherein the controller is configured such that, for an input signal in said first part of the first input range, the first switching driver operates to modulate the voltage at the first output node with a modulation frequency which is twice that for signals in the second part of the first input signal range.

7. The driver apparatus of claim 5 wherein said first part of the input signal range corresponds to input signal levels of greater magnitude than the second part of the input signal range.

8. The driver apparatus of claim 5 wherein the controller is configured such that, for a change in signal level in said second part of the first input range, the magnitude of change of the first controlled modulation index is the same as the magnitude of change of the second controlled modulation index.

9. The driver apparatus of claim 5 wherein the controller is configured such that, for a change in signal level in said second part of the first input range, the magnitude of change of the first controlled modulation index is lower than the magnitude of change of the second controlled modulation index.

10. The driver apparatus of claim 1 wherein the controller is configured such that the first controlled modulation index is not increased above a predetermined maximum value which is less than 1.

11. The driver apparatus of claim 1 wherein, for an input signal level in said first range, the first switching driver is configured to modulate the voltage at the first output node between one of the first and second DC voltages and a boosted voltage which is different to the first and second DC voltages.

12. The driver apparatus of claim 1 wherein, for a level of the input signal within a second input range, different to the first input range, each of the first and second switching drivers is configured to modulate the voltage at the respective first and second output node by controlling switching of the respective first and second output node between the first and second DC voltages.

13. The driver apparatus of claim 12 wherein the controller is configured such that, if the input signal varies within said second input range, a change in input signal level results in a change of the first controlled modulation index that has a different magnitude to any change in the second controlled modulation index.

14. The driver apparatus of claim 1 implemented as an integrated circuit.

15. An electronic device comprising the driver apparatus of claim 1.

16. A driver apparatus with first and second output nodes for driving a load with a differential drive signal based on an input signal, the driver apparatus comprising:

a first switching driver configured to modulate a voltage at the first output node with a first controlled modulation index;

a second switching driver configured to modulate a voltage at the second output node with a second controlled modulation index;

wherein the driver apparatus is operable in a first mode in which the first switching driver operates with an output impedance that varies with the first controlled modulation index and the second switching driver operates with an output impedance that does not vary with the second controlled modulation index; and a controller for controlling the first and second switching drivers in said first mode for a level of input signal within a first input range, such that, if the input signal varies within said first input range, a constant modulation frequency of the differential drive signal is maintained and, for at least a first part of the first input range, a change in input signal level results in a change of the first controlled modulation index that has a different magnitude to any change in the second controlled modulation index.

17. A driver apparatus configured to output first and second drive signals at respective first and second output nodes for driving a load connected between the first and second output nodes with a differential drive signal based on an input signal, the driver apparatus comprising:

a first switching driver configured to generate the first drive signal, the first switching driver being operable in a flying capacitor mode to generate the first drive signal by switchably connecting at least one flying capacitor into a signal path to the first output node to modulate the voltage at the first output node with a first controlled modulation index;

a second switching driver configured to generate the second drive signal, the second switching driver being operable in a switching DC mode to generate the first drive signal by switching the second output node between first and second DC voltages at a second controlled modulation index, wherein each of first and second voltages DC are maintained at a defined nominal voltage level throughout a switching cycle of the driver apparatus; and a controller for controlling the first and second switching drivers, wherein the controller is configured such that for a level of the input signal in a first range the driver apparatus is operated in a first apparatus mode in which first switching driver is operated in the flying capacitor mode and the second switching driver is operated in a switching DC mode and for a level of the input signal in a second, different, range the driver apparatus is operated in a second apparatus mode in which first switching driver is operated in the flying capacitor mode and the second switching driver is operated to maintain the voltage at the second output node at a constant one of the first and second DC voltages, wherein the modulation frequency of the differential drive signal is the same in the first and second apparatus modes.

18. A driver apparatus configured to output first and second drive signals at respective first and second output nodes for driving a load connected between the first and second output nodes with a differential drive signal based on an input signal, the driver apparatus comprising:

a first switching driver configured to modulate a voltage at the first output node with a first controlled modulation index to generate the first drive signal;

a second switching driver configured to modulate a voltage at the second output node with a second controlled modulation index to generate second drive signal;

wherein, for a level of the input signal within a first input range, the first switching driver is configured to modulate the voltage at the first output node by switchably connecting at least one flying capacitor into a signal path to the first output node and the second switching driver is configured to modulate the voltage at the second output node by controlling switching of the second output node between first and second DC voltages, wherein each of first and second voltages DC are maintained throughout a switching cycle of the driver apparatus; and a controller for controlling the first and second switching drivers such that, a change in input signal level within the first input range results in an increase of the first controlled modulation index and a decrease in the second controlled modulation or vice versa, wherein the magnitude of change of the first controlled modulation index is lower than the magnitude of change of the second controlled modulation index.

* * * * *